United States Patent [19]

Perlinski et al.

[11] Patent Number: 4,485,200

[45] Date of Patent: Nov. 27, 1984

[54] NEOPRENE LATEX CONTACT ADHESIVES

[75] Inventors: Witold Perlinski, Middlesex; Irwin J. Davis, Bridgewater; John F. Romanick, Denville, all of N.J.

[73] Assignee: National Starch and Chemical Corporation, Bridgewater, N.J.

[21] Appl. No.: 345,295

[22] Filed: Feb. 3, 1982

[51] Int. Cl.³ ...................... C08L 61/04; C08L 63/00
[52] U.S. Cl. .................................... 523/409; 523/413; 525/113; 525/119; 525/121
[58] Field of Search ................ 523/409, 413; 525/113, 525/119, 121

[56] References Cited

U.S. PATENT DOCUMENTS 3,124,548  3/1964  Yaroch .................................. 525/121
3,565,748  2/1971  Palmer et al. ........................ 525/121
4,342,843  8/1982  Perlinski et al. .................... 523/409

FOREIGN PATENT DOCUMENTS 0005944  1/1980  Japan .................................. 525/121

Primary Examiner—John C. Bleutge
Assistant Examiner—Robert E. L. Sellers
Attorney, Agent, or Firm—Edwin Szala; Ellen T. Dec

[57] ABSTRACT

Conventional carboxylated neoprene latex adhesives are improved with respect to their metal adhesion, heat and water resistance and bonding range by the addition thereto of an epoxy resin, preferably an epoxy resin prepared by the reaction of para-aminophenol with epichlorohydrin.

6 Claims, No Drawings

NEOPRENE LATEX CONTACT ADHESIVES

This application is directed to aqueous neoprene based contact adhesives characterized by superior metal adhesion and water and heat resistance.

Solvent based polychloroprene or chloroprene - containing copolymers (commonly referred to as "neoprene") adhesives have long been known in the art. These adhesives are often formulated as contact adhesives and, as such, are characterized by superior properties in areas of water resistance and metal adhesion. They are also characterized by a long bonding range or "open time", which means that there is a relatively long period after the adhesive is dry during which adhesive coated members can be successfully joined and bonded; suitable heat resistance, which refers to the ability of the bonded assembly to withstand elevated temperatures without lifting or deformation; and high immediate strength, which permits the bonded assembly to be handled and utilized directly after mating. In order to eliminate fire hazards and other environmental problems associated with these solvent based adhesives, attempts have been made to prepare these neoprene adhesives as latex systems (see, for example, U.S. Pat. No. 3,425,978). However, when the solvent based neoprene systems were replaced by latex based systems, the resulting contact adhesives were found to be inferior in quality, due primarily to their reduced metal adhesion particularly after exposure to moisture containing environments. Moreover, the heat resistance and "open time" were, in general, also inferior when compared with solvent based adhesives. For instance, where sufficient heat resistance is attained, the adhesives are deficient in bonding range, that is, the time after drying during which they can be pressed together and still form a suitable bond is too short for practical production applications. When the adhesive is formulated so as to lengthen the bonding range, the adhesive bond generally lacks sufficient rigidity, resulting in low initial strength and low shear strength, especially at elevated temperatures.

It is an object of the present invention to provide an aqueous neoprene contact adhesive characterized by improved metal adhesion, heat and water resistance as compared to conventional neoprene latex adhesives; which properties are, in some instances, superior to those heretofore achieved with the solvent based systems.

It is a further object of the invention to provide an aqueous contact adhesive possessing a high degree of heat resistance together with an extended period of open time.

These and other objects will be achieved in accordance with the invention described below.

In a copending U.S. patent application Ser. No. 237,791 filed Feb. 24, 1981, now U.S. Pat. No. 4,342,843, an improved neoprene adhesive composition was proposed which overcame many of the above-described problems of the prior art aqueous neoprene systems. The improved adhesive was prepared as a two-part system consisting essentially of an aqueous neoprene adhesive upgraded by the addition of an amine and epoxy. In these systems, shortly before use, 10 to 40 parts of the epoxy were added to an adhesive base containing 100 parts dry neoprene and sufficient polyamine to provide 50 to 150% of the stoichiometric amount required to cure the epoxy.

It has now been found that, for many applications, sufficient improvement in the properties of aqueous carboxylated neoprene adhesives is achieved merely by the addition of the epoxy component, with no need for further curing either with amines or other curing agents such as heat. In particular, the use of a specific epoxy resin produced by the reaction of para-aminophenol with epichlorohydrin in a neoprene latex contact cement dramatically improves the metal adhesion as well as the heat and water resistance thereof without the necessity for oven baking or for employing any additional curing agents.

Thus, the present invention discloses an aqueous contact adhesive composition consisting essentially of:
 (A)
  (i.) a carboxylated neoprene latex,
  (ii.) a tackifier selected from the group consisting of natural and modified rosins, polyterpene resins having a softening point of from about 40° C. to 150° C., phenolic resins, phenolic modified terpene resins, and aliphatic petroleum hydrocarbon resins having a Ball and Ring softening point of from about 40° C. to 135° C.,
  (iii.) a metallic oxide stabilizer,
  (iv.) antioxidant; and
 (B) an epoxy resin;
wherein for every 100 parts by weight of dry neoprene the epoxy resin component is present in an amount of 1 to 20 parts, the tackifier in an amount of 10 to 100 parts, the stabilizer in an amount of 0.5 to 10 parts and the antioxidant in an amount of 0.5 to 3 parts.

In a preferred embodiment, the epoxy resin of Part B comprises the reaction product of para-aminophenol and epichlorohydrin.

The contact adhesives of the present invention are generally useful in the applications wherein solvent based neoprene adhesives have been employed. For example, they may be used to bond wood, metal sheets and foils, plastic foam, plastic films and sheets, rubber, fiber glass, etc. either to similar or different surfaces. The resultant bonds will, in general, possess properties comparable or superior to those achieved with solvent based neoprenes and superior to those achieved with conventional neoprene latex adhesives.

Commercially available carboxylated neoprene latices or water dispersions thereof may be employed in producing the contact adhesives of the present invention. These are carboxylated latices which provide an acid equivalent level of up to about 0.5, preferably about 0.35, mol carboxyl per kg. latex solids. The choice of the particular type of carboxylated neoprene latex will, of course, depend on the properties required in the contemplated end use. For overall properties and ease of formulation, we have found the copolymers of chloroprene with methacrylic acid to be most preferred. The use of a mixture of such latices is also contemplated herein in order to achieve an adhesive having properties which could not be obtained from a single latex composition.

While the artisan in practicing the invention could prepare the emulsions using conventional techniques, they are most commonly available in latex form from du Pont. The preferable carboxylated latices are those designated by du Pont as Latex 101, Latex 102 and Latex 115, the latter having an acid equivalent of 0.33.

Suitable epoxy resins for use in the adhesives of the present invention include reaction products of bisphenol A and epichlorohydrin, epoxidized novolac resins formed by the reaction of epichlorohydrin with the resinous reaction product of phenol (or substituted phenols) and formaldehyde, resinous reaction products from epichlorohydrin and an aliphatic polyol such as glycerol, 1,4butanediol, poly(oxypropylene) glycol or similar polyalcoholic components and resins obtained by epoxidation with peracetic acid. Typical resins include the 4,4'-isopropylidenediphenol epichlorohydrin reaction product, one of the bisphenol A-epichlorohydrin type materials which is available commercially from Shell Chemical under the tradename Epon 828. These epoxy resins are available either in liquid or solid form and may be used directly or may preferably be emulsified with water at a concentration of, for example, 40 to 75% solids by weight for use herein.

The preferred epoxy resins for use in the contact adhesives of the present invention are prepared by the reaction of para-aminophenol with epichlorohydrin. Specifically the contemplated epoxy is available from Ciba Geigy as Epoxy Resin 0500 and has a theoretical structure as follows:

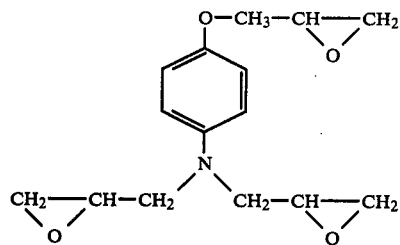

The resin is available as a liquid and may be used directly or may preferably be added as 60% solvent solution to facilitate addition and improve storage stability. Preferable solvents are methyl ethyl ketone and cellosolve acetate. Since the epoxy component is employed in such relatively small amounts herein, the addition of the epoxy in solvent form does not appreciably affect the aqueous properties of the neoprene contact cements of the invention.

It will be recognized that any of the tackifiers generally used in neoprene contact adhesives may be used herein. The tackifiers are usually resinous in nature and include, for example, (1) natural and modified resins such, for example, as wood rosin, tall-oil rosin, distilled rosin, hydrogenated rosin, dimerized rosin, and polymerized rosin; (2) glycerol and pentaerythritol ester of natural and modified rosins, such, for example, as the glycerol ester of pale wood rosin, the glycerol ester of hydrogenated rosin, the glycerol ester of polymerized rosin, the pentaerythritol ester of hydrogenated rosin, and the phenolic-modified pentaerythritol ester of rosin; (3) polyterpene resins having a softening point, as determined by ASTM method E28-58T, of from about 40° to 150° C.; the latter polyterpene resins generally resulting from the polymerization of terpene hydrocarbons, such as the bicyclic mono-terpene known as pinene, in the presence of Friedel-Crafts catalysts at moderately low temperatures; (4) phenolic resins such as BKUA 2370 (Union Carbide) or HRJ-790 or HRJ 587 (Schenectady Chemicals, Inc.); (5) phenolic-modified terpene resins such, for example, as the resin product resulting form the condensation in an acidic medium of a bicyclic terpene and a phenol; and (6) aliphatic petroleum hydrocarbon resins having a Ball and Ring softening point of from about 40° C. to 135° C.; the latter resins resulting from the polymerization of monomers consisting primarily of olefins and diolefins. It will be recognized that a portion, generally less than about 25%, of the tackifiers may be replaced by conventional liquid tackifying agents having softening points of as low as about 20° C.

The compositions described herein should also contain an antioxidant in order to prevent deterioration which is manifested as embrittlement and discoloration. Among the applicable antioxidants are phenyl-alpha-naphthylamine, phenyl-beta-naphthylamine, phenyl-betanaphthalene, and 2,2'-methylene-bis (4-methyl-6-tertiary butylphenol).

The relative amounts of the particular components employed will vary over a wide range depending upon the specific components as well as the desired end use. While the amounts may therefore be determined by the artisan, the following dranges (dry weights) may be used as a guideline; based on 100 parts by weight of dry neoprene, the epoxy resin will be present in an amount of 1 to 20, preferably 5-15, parts by weight, the tackifier in an amount of 10 to 100, preferably 20-60 parts and the antioxidant is an amount of 0.5 to 3 parts.

Also generally employed herein are metallic oxide stabilizers, preferably zinc oxide, such as used in conventional neoprene contact adhesives. These metallic oxides serve as acid acceptors by neutralizing the hydrochloric acid which is released upon the aging of neoprene and thereby minimize the deterioration of the substrates which come into contact with the films derived from the adhesives. They serve, furthermore, as curing agents for the neoprene, thereby increasing the tensile strength of the resulting adhesive bonds, and also aid in the room temperature crosslinking of the neoprene films. The selected metallic oxide should be present in a concentration ranging up to a maximum of about 10%, generally 2 to 5%, and preferably 1-3% by weight of the dry neoprene in the adhesive.

In addition to the required components described above, various additives which are conventionally used in neoprene-based contact adhesives may also be employed herein. Such additives include, for example, fillers and pigments such as talc and titanium dioxide, thickeners, surfactants, solvent, etc. These additives are used in minor amounts comparable to those used in neoprene contact adhesives of the prior art.

When used, the adhesive may be used directly or may be further diluted with water depending on the solids level desired for the particular method of application to be employed. The adhesives are applied in conventional manner to one or preferably both of the surfaces to be bonded. Thus, they may be applied by brushing, spraying, curtain coating, roll coating, etc. The thus coated surface(s) generally are then force-dried and bonded by the use of sufficient pressure. The dry coating weights at which these adhesives are applied will, of course, vary according to its specific end use application and may range, for example, from about 4 to 25 pounds per thousand square feet of coated surface.

While not wishing to be bound by theory, it is postulated that the improvements provided by the adhesive of the present invention are achieved, in part, as a result of the nature of the curing reaction itself. In these adhesive systems, the ionic, non-stoichiometric, chain propagated reaction minimizes the case hardening normally associated with stoichiometric reactions thereby resulting in an overall better curing system.

In the following examples, which further illustrate the various embodiments of the invention, all parts are by weight and all temperatures in degrees Celsius unless otherwise noted.

TEST PROCEDURES

In the Examples below, the following test procedures are used to evaluate the neoprene adhesives of the present invention.

The test specimens were prepared by applying 3–4 mil wet films of the adhesive to 0.020 inch degreased aluminum and 0.25 inch plywood panels by means of a wire wound bar. The coated panels were then force dried for approximately 3 minutes at 120° C. and mated using a Black Brothers rotary press. The panels were then cut into 1×5 inch splints with 2 inch square overlap. These splints were conditioned/cured at 22° C. and also six days at 49° C. (The latter conditioning step provides an accelerated cure approaching ultimate cure at ambient temperature.) The splints were then tested on an Instron Tensile Tester where they were delaminated at a crosshead speed of 0.2 inches per minute while the thus determined tensile shear strength of the adhesive bonds were recorded in pounds per square inch. Samples were tested after heating to 82° C. (for heat resistance) and tested wet after soaking in water for 16 hours (for water resistance).

EXAMPLE I

Six adhesive formulations were prepared using 100 parts Neoprene Latex 102, Epoxy Resin 0500 and Dresinol tackifier in the dry amounts shown in Table I. Formulations B, C, D, E and F adhesives which have been prepared in accordance with the teachings of the present invention. Formulation A, lacking any epoxy, is typical of the aqueous neoprene adhesives of the prior art. Formulation E illustrates the reduction in desired properties observed when larger quantities of epoxy (i.e. >20%) are employed.

TABLE I

|  | A | B | C | D | E | F |
|---|---|---|---|---|---|---|
| Neoprene Latex 102 (dry weight) | 100 | 100 | 100 | 100 | 100 | 100 |
| Surfynol SE | 2.25 | 2.25 | 2.25 | 2.25 | 2.25 | 2.25 |
| Dresinol 215 | 30 | 30 | 30 | 30 | 30 | 30 |
| Epoxy Resin 0500 | 0 | 9 | 14 | 18 | 27 | — |
| Epon 828 | — | — | — | — | — | 15 |
| Zinc Oxide | 1 | 1 | 1 | 1 | 1 | 1 |
| Antioxidant | 2 | 2 | 2 | 2 | 2 | 2 |

When tested as described above, tensile shear strength and fusion results as shown in Table II were obtained. Results are expressed in pounds per square inch.

TABLE II

| Formulation | Immediate | 82° C. Heat Resistance | | | 16 hr. soak | Fusion |
| | | 2 wk. 22° C. | 4 wk 22° C. | 6d/49° C. | | |
|---|---|---|---|---|---|---|
| A | 25 | 29 | 33 | 60 | 50 | G |
| B | 15 | 63 | 85 | 180 | 200 | VG |
| C | 12 | 80 | 120 | 237 | 320 | VG |
| D | 10 | * | 101 | 185 | 180 | Good |
| E | 10 | * | 50 | 200 | 120 | Poor |
| F | 13 | 32 | 55 | 105 | * | VG |

(*not tested)

The formulations of the invention exhibited good pot life and long bonding range with the open time for formulations B, C, D, and F varying between 20 and 30 minutes. Formulation E had an open time of 2 minutes and showed some signs of overcuring. The coated formulation A had bonding range of 10 minutes.

EXAMPLE II

Additional adhesives were prepared as in Example I using Neoprene Latex 115 (excluding surfactant). Two control samples (G & H) were prepared without added epoxy and one sample (Formulation J) was prepared with 7.2 parts Epoxy Resin 0500. The results of testing are shown in Table III.

TABLE III

| Formulation | Immediate | 82° C. Heat Resistance | | | 16 hr. soak | Fusion |
| | | 2 wk. 22° C. | 4 wk 22° C. | 6d/49° C. | | |
|---|---|---|---|---|---|---|
| G | 50 | 55 | 50 | 150 | 130 | Good |
| H | 36 | 46 | 49 | 132 | 122 | Good |
| J | 35 | 62 | 75 | 183 | 180 | VG |

EXAMPLE III

For comparative purposes, a set of samples was prepared as in Example I using an anionic latex, Neoprene 750. Thus 100 parts (dry weight) Neoprene Latex 750 were combined with 40 parts Pentalyn H (tackifier), 2 parts antioxidant and 3 parts zinc oxide. To one sample (L) 9 parts Epoxy Resin 0500 were added while to another sample (M) 15 parts Epon 828 were added. The results of testing are shown in Table IV.

TABLE IV

| Formulation | 82° C. Heat Resistance | | 16 Hr. Soak |
| | Immediate | 8 wk. 22° C. | 8 weeks 22° C. |
|---|---|---|---|
| K (no epoxy) | 10.5 | 18 | 112 |
| L | 7.0 | 8.5 | 78 |
| M | 8.5 | 10.5 | 91 |

As can be seen from the results of the above testing, the use of an Epoxy resin in these anionic systems results in a decrease in heat and water resistant properties.

The preferred embodiments of the present invention having been described above, various modifications and improvements thereon will now become readily apparent to those skilled in the art. Accordingly, the spirit and scope of the present invention is defined not by the foregoing disclosure, but only by the appended claims.

What is claimed is:

1. An improved two-part aqueous contact adhesive composition consisting essentially of:
   (A)
   (i.) a carboxylated neoprene latex,
   (ii.) a tackifier selected from the group consisting of natural and modified rosins, polyterpene resins having a softening point of from about 40° to 150° C., phenolic resins, phenolic-modified terpene resins, and aliphatic petroleum hydrocarbon resins having a Ball and Ring softening point of from about 40° to 135° C.;
   (iii.) a metallic oxide stabilizer; and
   (iv.) an antioxidant other than a metallic oxide of (iii);
   (B) an epoxy resin;
   wherein for every 100 parts by weight of dry neoprene the epoxy resin component is present in an amount of 1 to 20 parts, the tackifier in an amount of 10 to 100 parts, the stabilizer in an amount of 0.5 to 10 parts and the antioxidant in an amount of 0.5 to 3 parts, the adhesive being cured by the addition of the epoxy component.

2. An improved two-part aqueous contact adhesive composition consisting essentially of:
   (A)
   (i.) a carboxylated neoprene latex,
   (ii.) a tackifier selected from the group consisting of natural and modified rosins, polyterpene resins having a softening point of from about 40° to 150° C., phenolic resins, phenolic-modified terpene resins, and aliphatic petroleum hydrocarbon resins having a Ball and Ring softening point of from about 40° to 135° C.;
   (iii.) a metallic oxide stabilizer; and
   (iv.) an antioxidant other than a metallic oxide of (iii);
   (B) an epoxy resin produced by the reaction of para-aminophenol with epichlorohydrin;
   wherein for every 100 parts by weight of dry neoprene the epoxy resin component is present in an amount of 1 to 20 parts, the tackifier in an amount of 10 to 100 parts, the stabilizer in an amount of 0.5 to 10 parts and the antioxidant in an amount of 0.5 to 3 parts, the adhesive being cured by the addition of the epoxy component.

3. The adhesive composition of claim 2 wherein the epoxy resin is employed in the form of a solvent solution.

4. The adhesive composition of claim 3 wherein the epoxy resin is employed in the form of a 60% solvent solution in methyl ethyl ketone or cellosolve acetate.

5. The adhesive composition of claim 1 or 2 wherein the neoprene latex comprises a copolymer of chloroprene with methacrylic acid.

6. The adhesive composition of claim 1 or 2 wherein the metallic oxide stabilizer is zinc oxide and is present in an amount of about 1-3 parts by weight of the dry neoprene.

* * * * *